United States Patent [19]

Peterson

[11] 4,254,920

[45] Mar. 10, 1981

[54] AIR SHAFT

[75] Inventor: Bruce E. Peterson, Acushnet, Mass.

[73] Assignee: Double E Company, Inc., Brockton, Mass.

[21] Appl. No.: 916,841

[22] Filed: Jun. 19, 1978

[51] Int. Cl.³ .................... B65H 75/18; B65H 75/24
[52] U.S. Cl. ................................................ 242/72.1
[58] Field of Search ............... 242/72, 72.1, 72 B, 242/78.3, 46.4, 46.6, 462

[56] References Cited

U.S. PATENT DOCUMENTS

| | | | |
|---|---|---|---|
| 2,705,111 | 3/1955 | Bruestle | 242/72.1 X |
| 2,952,418 | 9/1960 | Rice | 242/72.1 |
| 3,052,420 | 9/1962 | Roberts | 242/72.1 |
| 3,507,455 | 4/1970 | Andersson | 242/72.1 |
| 3,977,616 | 8/1976 | Owens et al. | 242/46.4 |
| 4,142,690 | 3/1979 | Karle et al. | 242/72.1 |

FOREIGN PATENT DOCUMENTS

| | | | |
|---|---|---|---|
| 942384 | 11/1963 | United Kingdom | 242/72 B |
| 573428 | 9/1977 | U.S.S.R. | 242/46.4 |
| 589191 | 1/1978 | U.S.S.R. | 242/46.4 |

Primary Examiner—Stanley N. Gilreath
Attorney, Agent, or Firm—James B. Lampert

[57] ABSTRACT

An expansible shaft including a hollow axially-extending body and operatively coupled core engaging and retracting sections within the body. The core engaging section includes a core engager movable relative to the body in a direction generally perpendicular to the axis of the body and biased towards a core engagement position in which it projects beyond the wall of the body; and the retracting section includes an actuator arranged to overcome the bias and move the core engager radially inwardly from its core engagement position.

18 Claims, 6 Drawing Figures

AIR SHAFT

FIELD OF THE INVENTION

This invention relates to expansible shafts.

BACKGROUND OF THE INVENTION

There are available a number of fluid operated, expansible shafts. In most, buttons in the periphery of the shaft are forced radially outward into engagement with a surrounding core when fluid under pressure is supplied to the shaft interior. These devices are subject to several problems, including loss of holding force due to leakage, clogging caused by fiber particles and other foreign materials, and inability without expensive couplings to add make-up air under leakage conditions.

SUMMARY OF THE INVENTION

The present invention is directed to an expansible shaft in which the problems of fluid leakage failure are eliminated. The core-engaging buttons are driven outwardly by a spring loaded cam, fluid under pressure is used to retract rather than to expand them, and any possible leakage will occur only when the shaft is stationary. In preferred embodiments, dirt and debris clogging is prevented by a flat circular spring that both seals the annulus between each button and the shaft periphery and retracts the buttons radially inwardly.

DESCRIPTION OF THE PREFERRED EMBODIMENTS

The drawings show the preferred embodiment, which is then described. In the drawings.

Figure 1:
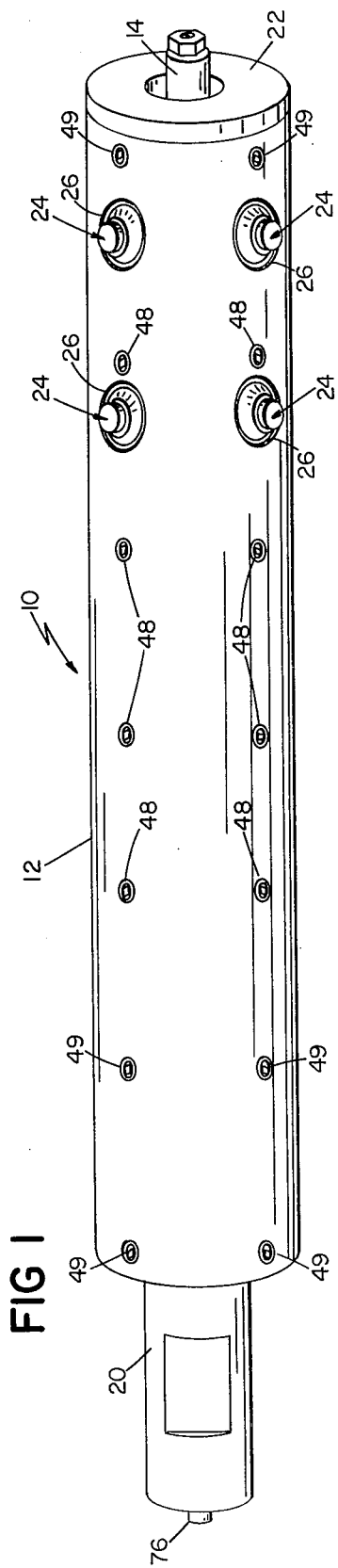
FIG. 1 is a perspective view of the shaft of the preferred embodiment with the buttons fully expanded.
Figure 2:
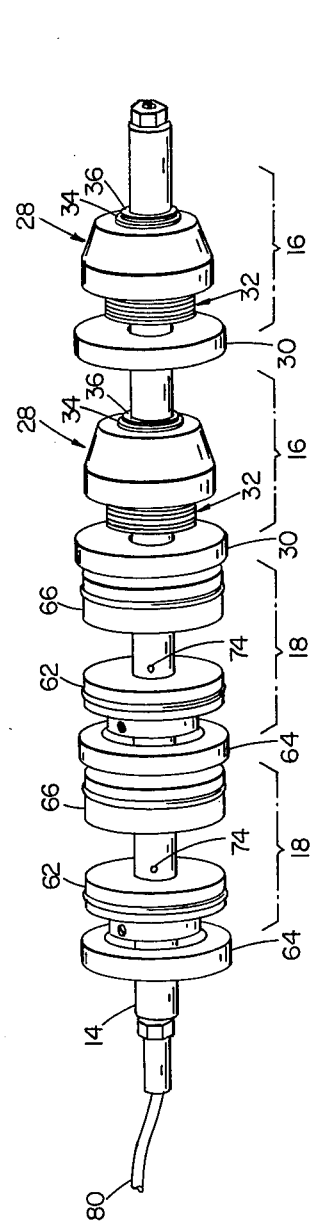
FIG. 2 is a perspective view of internal parts of the shaft of FIG. 1.

Referring now to the drawings, expansible shaft 10 includes a hollow cylindrical body 12 in which is mounted a co-axial, axially movable operating rod 14. In the embodiment shown, shaft 10 has two axially-spaced button sections 16 and two piston sections 18, a mounting arbor 20 at the end of the shaft adjacent piston sections 18, and an end plate 22 at the end adjacent button sections 16.

Figure 6:
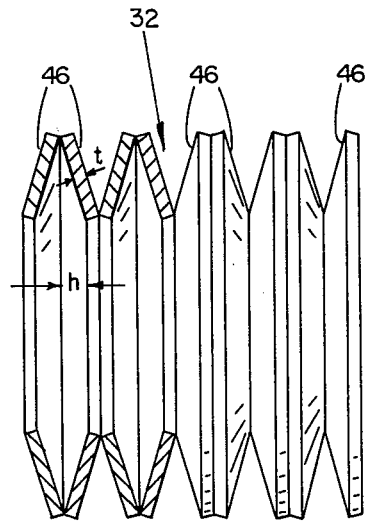
FIG. 6 is a sectional view of portions of the preferred embodiment.

Each of button sections 16 includes four buttons 24, spaced at 90° intervals around and projecting through respective holes 26 in the cylindrical wall of body 12, a cam 28 on rod 14, a stop 30, and a spring 32 between stop 30 and cam 28 and urging the two apart. A stop washer 34 on, and snap ring 36 attached to, rod 14 limit the axial movement of cam 28 away from stop 30. Cam 28 includes a central axial bearing 38 forming a close slip fit with rod 14 and a cylindrical recess 40 at the end thereof facing stop 30 receiving an end of spring 32. The exterior of the cam is circular in transverse cross-section and defines both cylindrical and truncated conical camming surfaces, 42 and 44 respectively. The slope of conical surface 44 is 1:4. Stop 30 is a cylindrical disc having a central hole forming a loose slip fit with rod 14 and an outer periphery forming a similar fit with the interior cylindrical wall 11 of body 12. Spring 32 comprises a series stack of belleville spring washers 45 (see FIG. 6). Four circumferentially-spaced cap screws 48 extend radially through the wall of body 12 and engage the side of stop 30 opposite spring 32, thus preventing the stop from moving axially away from cam 28.

Each button 24 is circular in cross-section and has an inner portion 51 of major diameter forming a slip fit with hole 26, an outer portion 52 of reduced diameter and an annular step 54 between the two. A ball 50 is mounted in a socket at the radially inner end of inner portion 51. A combination spring-seal 56 fits in a counterbore 58 at the outer end of hole 26 and is held in place by a snap ring 60 in groove 59. Spring-seal 56 includes inner and outer steel rings, which form close fits with, respectively, counterbore 58 of hole 26 and reduced diameter portion 52 of button 24, bonded together by an intermediate ring of urethane or a similar elastomeric material.

Each piston section 18 includes a piston 62 fixed on rod 14 by a set screw 57, an annular piston stop 64, and a seal plate 66. O-Rings 68 in recesses in the inner and outer peripheries of pistons 62 and seal plate 66 form seals with rod 14 and the inner surface 11 of body 12. The side of piston 62 facing seal plate 66 is flat; the opposite side defines a stepped cylinder of reduced diameter sized to fit into the center hole 72 of stop 64. A counterbore 70 is provided in the face of seal plate 66 facing piston 62. Stop 64 and seal plate 66 are restrained against axial movement away from piston 60 by respective sets of radially-inwardly projecting cap screws 48 which engage the sides of the stop and seal plate opposite piston 62.

Other sets of cap screws 49 hold end plate 22 and mandrel 20 in place.

Rod 14 includes an air bore 78 extending axially therethrough, and intersecting bores 74 extending radially from central bore 78 to within the recess 70 of a respective one of seal plates 66. The end of air bore 78 at end plate 22 is plugged. Flexible hose 80 connects the other end of air bore 78 to an air bore 82 through mandrel 20, and an air valve 76 is threaded into the free end of mounting mandrel 20.

Figure 3:
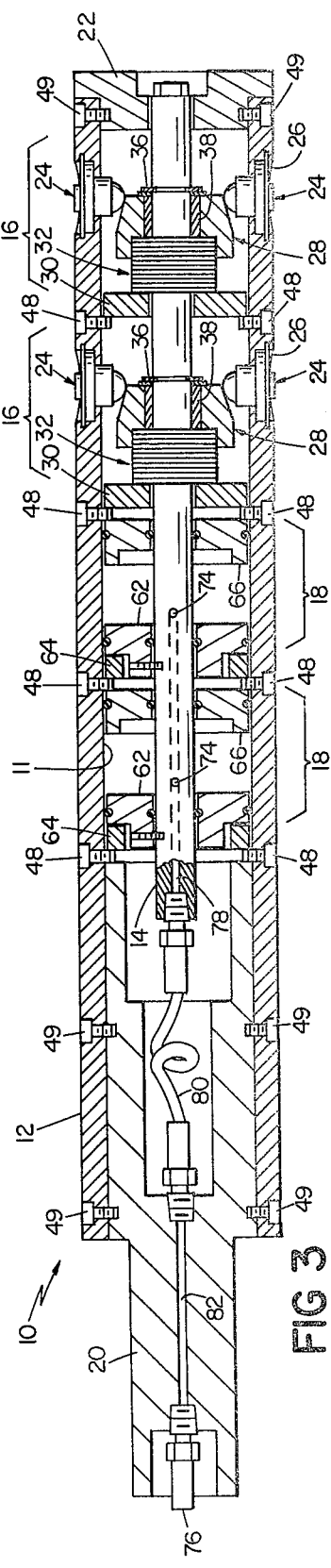
FIG. 3 is a longitudinal cross-section of the shaft of FIG. 1 with the buttons retracted.

As will be evident, rod 14 is axially movable within and relative to body 12, and the amount of axial movement is limited by the distance between the stops 64 and seal plates 66 of piston sections 18. At one extreme (in which buttons 24 are fully retracted, substantially as shown in FIG. 3) the left end of piston 62 fits within central bore 72 of stop 64 and axially-facing annular piston face 61 engages the facing end surface 65 of stop 64. At the other extreme (in which buttons 24 are fully extended, slightly beyond the position shown in FIG. 4) the opposite end 63 of piston 62 engages the annular surface 37 of seal plate 66 surrounding recess 70. Each cam 28 has an axial length slightly greater than the permitted axial travel of rod 14. The cams are positioned on the rod so that buttons 24 will engage the minimum diameter end of the conical cam surface 44 of the respective cam 28 when rod 14 is in the button-retracted position, and the other end of cam 28 (e.g., the far end of the cylindrical cam surface 42) when rod 14 has moved to the button-extended position. Springs 32 bias rod 14 towards the button-extended position; and spring-seals 56 hold buttons 24 against their respective cams.

The number of belleville washers 46 in each spring 32, and the configuration of each washer, is such that the force exerted by the spring remains substantially constant as rod 14 moves between its two extreme positions. In practice, washers having an h/t ratio (t being the thickness of the material of the washer and h being the free height of the washer less its thickness) in the range of 1.2 to 1.7 (typically 1.41) are used, and the total number of washers is such that each washer is almost flat when the rod is in the extreme button-retracted position, and in the button-extended position the deflection of each washer will be not less than about ½ h.

Figure 4:
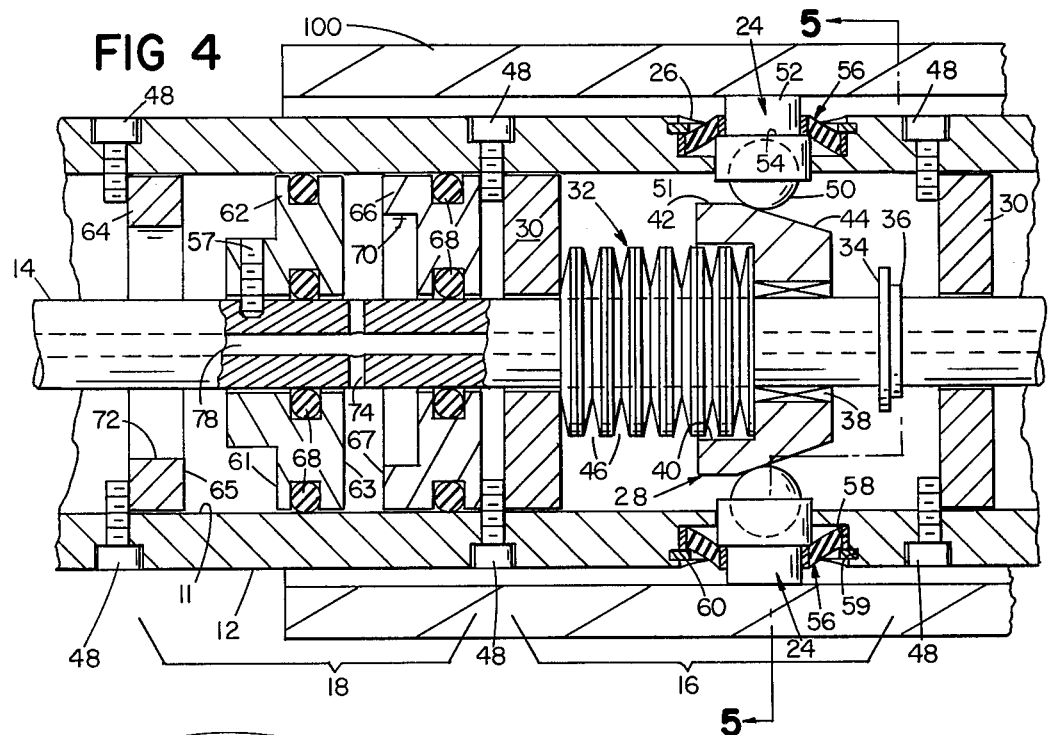
FIG. 4 is a longitudinal cross-section of portions of the shaft of FIG. 1 with the buttons expanded in contact with a core.
Figure 5:
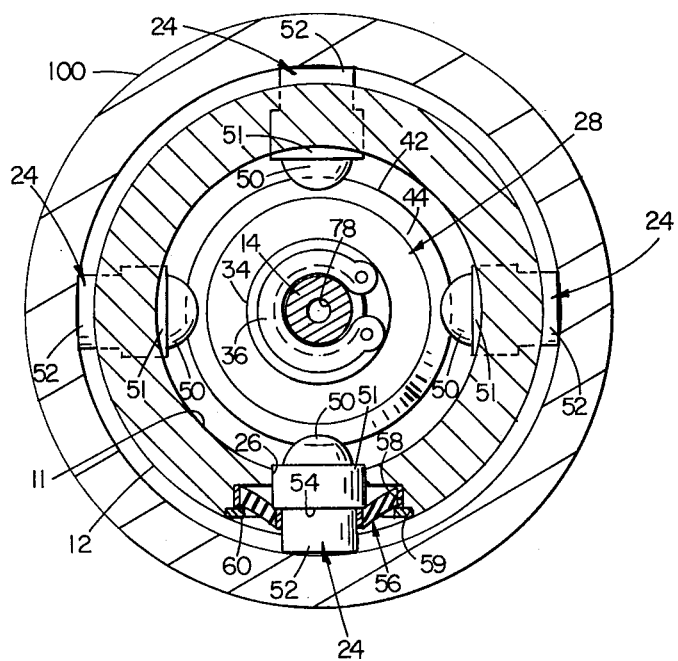
FIG. 5 is a sectional view taken at 5—5 of FIG. 4.

In use, shop air is connected to air valve 76 causing air under pressure to flow, through bores 82, 74, 78, into recesses 70 between pistons 60 and seal plates 66, forcing the pistons away from the seal plates and moving rod 14 to the left (as shown). Stops 36 engage the right (as shown) ends of cams 28 and pull the cams to the left, against the force of springs 32. Pistons 62 continue to move away from plates 66 until, as shown in FIG. 3, piston face 61 engages stop 64. In this position, balls 50 of buttons 24 are aligned with the minimum diameter ends of cams 28 and seal-springs 56 force the buttons radially inwardly until their outer ends are flush with, or slightly within, the outer cylindrical surface of body 12. Shaft 10 may now be inserted into a core 100 (FIGS. 4 and 5).

When the shaft is in position within the core, the supply of pressurized air is disconnected, valve 78 is relieved, the pressure in the piston section 18 drops to atmospheric, and springs 32 push cams 28 away from stops 30, to the right as shown. As the cams move, buttons 24 ride up conical cam surfaces 44 and are forced radially outwardly. Cams 28 continue to move axially, forcing buttons 24 radially, until the buttons tightly engage the inside of core 100. If the size of the core permits, buttons 24 will be forced outwardly to their fully extended configuration (with balls 50 engaging cylindrical cam surfaces 42) and rod 14 and cam 28 will continue to advance axially until the flat surfaces 63 of pistons 62 come into engagement with surfaces 67 of seal plates 66.

OTHER EMBODIMENTS

In other embodiments, the structure, i.e., mandrel 20 and end plate 22, at opposite ends of body 12 may be varied as required depending on the type of support or other machinery with which the expansible shaft is to be used. Similarly, different shafts will include different numbers of button sections 16 and piston sections 18, and springs 32 may be of different types and form. Typically, the number of button sections 16 will depend on the particular core, roll, etc. to be supported; the springs of each will provide the force needed to insure the buttons positively engage the core; and sufficient piston sections 18 will be provided to retract the springs of whatever button sections are present.

These and other embodiments will be within the scope of the following claims:

What is claimed is:

1. An expansible shaft comprising:
a hollow axially-extending cylindrical body;
a core engaging section within said body;
a retracting section within said body and spaced axially of said core engaging section; and,
an operating rod extending generally coaxially of said body and coupling said core engaging and said retracting sections,
said core engaging section including a plurality of circumferentially-spaced core engagers each movable radially relative to said body between a core engagement position in which it projects beyond the cylindrical wall of said body and a withdrawn position radially inwardly of said core engagement position thereof, a cam mounted on said rod and having a camming surface engaging said core engagers, a spring mounted coaxially of said rod and engaging said cam and biasing said cam in one axial direction such that said camming surface urges said core engagers towards said core engagement positions thereof, and a stop within said body restrained against movement relative to said body in the axial direction opposite said one direction and engaging the end of said spring opposite said cam,
said retracting section including a piston mounted coaxially of said rod and restrained against movement relative to said rod in the axial direction opposite said one direction such that movement of said piston in said direction opposite said one direction moves said rod in said direction opposite said one direction, and a sealing plate mounted coaxially of said rod such that said rod is movable axially relative to said sealing plate and said sealing plate is restrained against axial movement relative to said body in said one direction, and
said operating rod defining an internal conduit providing for flow of fluid under pressure to a port axially intermediate the piston and sealing plate of said retracting section, said rod being coupled to said piston and said cam such that said fluid under pressure forces said piston in said axial direction opposite said one direction against the bias of said spring of said core engaging section thereby moving said rod and said cam in said direction opposite said one direction.

2. The shaft of claim 1 wherein the spring is a series stack of belleville washers.

3. The shaft of claim 1 wherein said cam of said core engaging section is mounted coaxially on said rod and has a frusto-conical camming surface engaging said core engagers and said spring engages an axially-facing surface of said cam.

4. The shaft of claim 3 including a stop attached to said rod and arranged to engage said cam and force said cam in said direction generally opposite said one direction in response to such movement of said rod.

5. The shaft of claim 4 wherein said sealing plate is positioned axially intermediate said piston and said core engaging section.

6. The shaft of claim 5 including means limiting the total axial movement of said piston to a distance not greater than the overall axial length of said cam.

7. The shaft of claim 1 wherein said core engaging section includes at least three core engagement buttons arranged in a plane perpendicular to the axis of said shaft and circumferentially spaced from each other around the wall of said body.

8. The shaft of claim 1 wherein said core engager comprises a core engagement button extending through an opening in the wall of said body, and including means providing an annular seal surrounding said button and sealingly engaging the periphery of said button and said wall of said body, and biasing said button radially inwardly.

9. The expansible shaft of claim 1 including a plurality of said core engaging sections and a plurality of said retracting sections, and wherein said rod is operatively connected to all of said sections.

10. The expansible shaft of claim 1 wherein said cam of said core engaging section is mounted coaxially of said rod and defines a generally frusto-conical camming surface engaging said core engagers thereof, said spring of said core engaging section engages an end of said cam thereof, said core engaging section includes a stop restrained against movement relative to said body in a direction generally opposite said one direction and engaging the end of said spring thereof opposite said cam thereof and said sealing plate is mounted on said rod and sealingly engages the outer surface of said rod and the inner surface of said body.

11. The expansible shaft of claim 10 wherein said spring comprises a series stack of belleville washers.

12. The expansible shaft of claim 10 including a plurality of said retracting sections mounted within said body in axial alignment with each other and with said core engaging sections, and wherein a conduit within said operating rod extends from an inlet adjacent one end thereof to a respective port of each of said retracting sections axially intermediate said piston and said sealing plate of said each retracting section.

13. The expansible shaft of claim 10 wherein each of said retracting sections includes a stop arranged to engage said piston thereof and in cooperation with said sealing plate thereof to limit movement of said piston axially of said shaft to a distance not greater than the axial length of a said cam.

14. In an expansible shaft of the type in which a shaft engager projects through an opening in an axially-extending wall of an axially-extending body and is movable relative to the body in directions generally perpendicular to the axis of the body, at least a portion of said shaft engager being circular in cross-section transverse to the direction of movement thereof relative to said body, that improvement comprising:

an annular seal having an inner annular portion surrounding and sealing engaging the periphery of the circular in-cross section portion of said shaft engager, an outer annular portion sealingly engaging the surrounding portion of said body, and an intermediate annular portion of elastomeric material attached to each of the inner and outer annular portions, said inner and outer annular portions being restrained against movement in said directions generally perpendicular to the axis of said body such that when said shaft engager is moved relative to said body in one of said directions, said seal permits such movement and simultaneously exerts on such shaft engager force tending to move said shaft engager in the opposite direction.

15. An expansible shaft comprising:

a hollow cylindrical body of substantially uniform diameter throughout its length;

a plurality of axially-spaced core engaging sections within said body;

a plurality of axially-spaced retracting sections within said body; and, an operating rod extending generally coaxially, of, said body and coupling said core engaging and said retracting sections, each of said core engaging sections including a plurality of circumferentially-spaced core engagers each extending radially through said body and radially movable between a core engagement position in which it projects beyond the cylindrical wall of said body and a withdrawn position radially inwardly of said core engagement position thereof, a cam mounted on said rod and having a generally frusto-conical camming surface engaging said core engagers, a spring mounted coaxially of said rod and engaging one end of said cam and biasing said cam in one axial direction such that said camming surface urges said core engagers towards said core engagement positions thereof, and a stop within said body restrained against movement relative to said body in the axial direction opposite said one direction and engaging the end of said spring opposite said cam, and each of said retracting sections including a piston mounted coaxially of said rod with its periphery in sliding sealing engagement with the interior cylindrical wall of said body, and a sealing plate mounted coaxially of said rod in sliding sealing engagement with the outer surface of said rod end in sealing engagement with said interior cylindrical wall and restrained against axial movement relative to said body in said one direction, and said operating rod defining an internal conduit providing for flow of fluid under pressure to a respective port axially intermediate the piston and sealing plate of each of said retracting sections, and being coupled to said pistons and said cams such that said fluid under pressure forces each of said pistons in said axial direction opposite said one direction, against the bias of said spring of said core engaging section thereof.

16. The shaft of claim 15 wherein each of said retracting sections includes an annular recess intermediate and defined by one of said piston and sealing plate thereof, said recess surrounding said rod and said port opening thereinto.

17. The shaft of claim 15 wherein said core engagers are biased radially inwardly.

18. The shaft of claim 15 wherein each of said cams is slidably mounted on said rod, and is coupled to said rod by a coupling member fixed to said rod and engaging the end of said cam opposite the spring engaging said cam.

* * * * *

UNITED STATES PATENT AND TRADEMARK OFFICE
CERTIFICATE OF CORRECTION

PATENT NO. : 4254920
DATED : March 10, 1981
INVENTOR(S) : Bruce E. Peterson

It is certified that error appears in the above-identified patent and that said Letters Patent are hereby corrected as shown below:

Column 2, line 59 "37" should be --67--

Signed and Sealed this

Twenty-sixth Day of May 1981

[SEAL]

Attest:

RENE D. TEGTMEYER

Attesting Officer

Acting Commissioner of Patents and Trademarks